No. 638,968. Patented Dec. 12, 1899.
W. H. JONES.
FENCE MACHINE.
(Application filed Mar. 8, 1899.)
(No Model.)
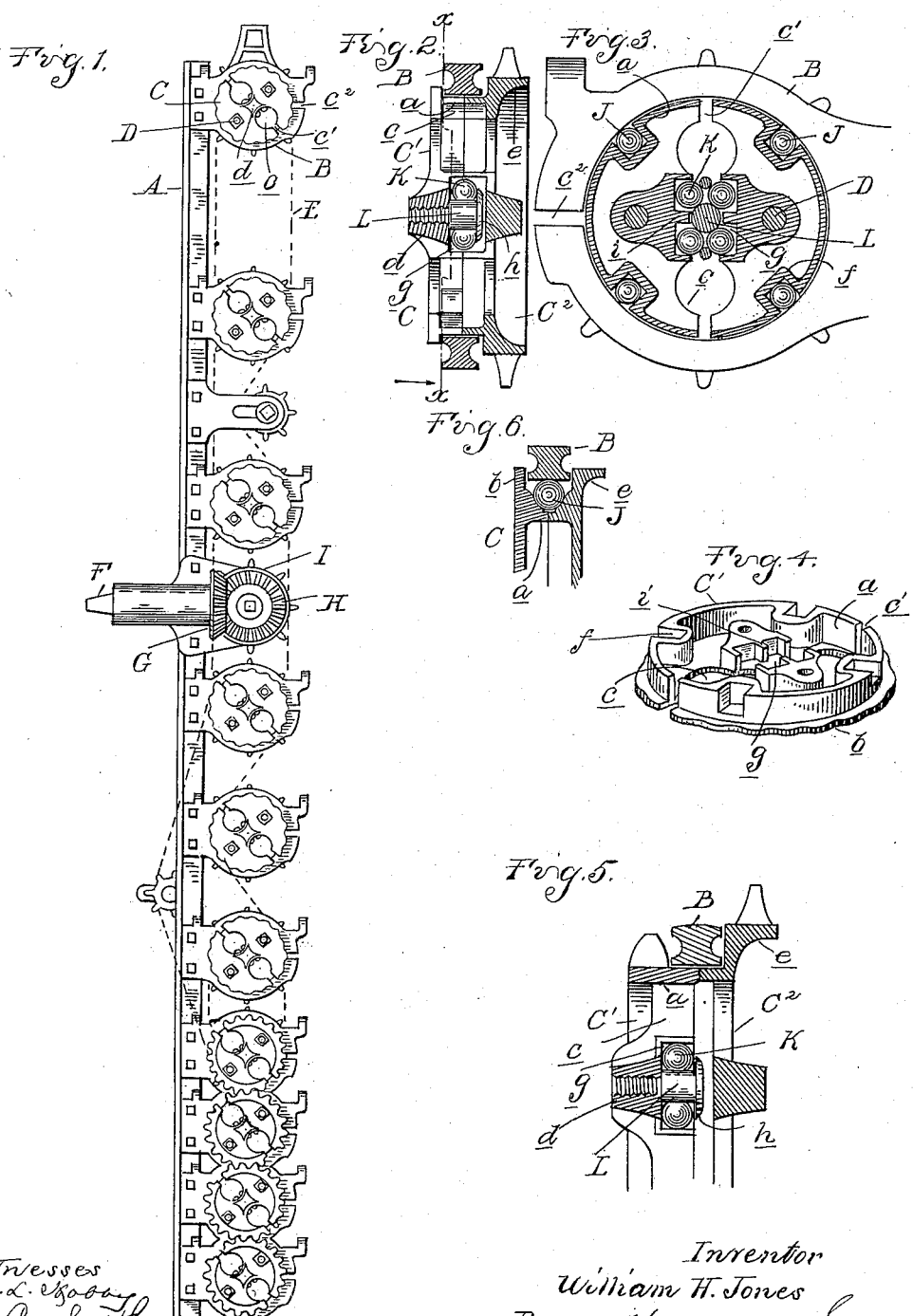
Witnesses
Inventor
William H. Jones
By Attys.

UNITED STATES PATENT OFFICE.

WILLIAM H. JONES, OF HOLLY, MICHIGAN.

FENCE-MACHINE.

SPECIFICATION forming part of Letters Patent No. 638,968, dated December 12, 1899.

Application filed March 8, 1899. Serial No. 708,216. (No model.)

*To all whom it may concern:*

Be it known that I, WILLIAM H. JONES, a citizen of the United States, residing at Holly, in the county of Oakland and State of Michigan, have invented certain new and useful Improvements in Fence-Machines, of which the following is a specification, reference being had therein to the accompanying drawings.

My invention relates to fence-machines of that class comprising a frame having a plurality of twister-wheels journaled therein and spaced from each other at proper distances to correspond to the wires of a fence.

More particularly the invention consists in the construction of the twister-wheels; and it is the object of the invention to diminish the friction of said wheels both in turning in their journals and the friction of the wires in passing through the apertures in the wheels.

My invention further consists in the peculiar construction, arrangement, and combination of the parts, as hereinafter described and claimed.

In the drawings, Figure 1 is a side elevation of my fence-machine. Fig. 2 is a cross-section through one of the twister-wheels. Fig. 3 is a section on line $x\,x$, Fig. 2. Fig. 4 is a perspective view of one of the sections of the twister-wheel detached. Fig. 5 is a section similar to Fig. 2 of another one of the twister-wheels, slightly modified; and Fig. 6 is a similar section showing another modification.

A is the frame, preferably comprising an angle-bar to which is secured a series of annular bearings B, in each of which one of the twister-wheels C is journaled. These wheels are formed with an annular groove adapted to engage with the annular bearing B, and to permit of the wheels being engaged with said bearings they are formed in two sections $C'$ and $C^2$, which abut against each other in the central plane of the bearing and are secured together by suitable clamping-bolts, such as D.

The section $C'$ comprises a disk having the inwardly-extending annular flange $a$, adapted to fit within the annular bearing B and the peripheral flange $b$, extending to the side of said bearing. Upon opposite sides of the center of this disk are formed the wire-apertures $c$, and the central portion of the disk is reinforced by the boss or lug $d$. The section $C^2$ is similarly formed, but is provided with the outwardly-extending annular flange $e$, on which are formed sprocket or gear teeth adapted to engage with the drive-chain or adjacent gear, according to the position of the twister in the frame.

As it is customary in the construction of fences to have the lower wires closely spaced and the upper wires a greater distance apart, the drive connection for the various twister-wheels is preferably formed by a sprocket-chain (indicated by the dotted line E, Fig. 1) which connects all of the upper wheels, while the twisters for the closely-spaced lower wires are preferably geared together. This necessitates providing one of the twisters (shown in Fig. 5) with both sprocket and gear, arranged upon opposite sides of the bearing.

F is a crank-shaft connected by the bevel-gears G and H to a drive-sprocket I, which engages with the sprocket-chain and forms a drive connection for all of the twisters.

The parts thus far described have been previously used and form no part of my present invention, which I will now describe in detail.

The first object which I desire to accomplish is to diminish the friction of the twister-wheels in their bearings, and to do this I insert a number of balls J between the flanges $a$ of the twister-section and the annular bearing B. These may be placed in an annular groove formed in the twister-wheel, as indicated in Fig. 6; but I preferably place them in sockets $f$, formed in the twister-sections, as shown in Fig. 3, these sockets being of such shape as to only contact with the balls at a few points to diminish the friction of the ball in turning therein. The sockets $f$ are preferably formed in the section $C'$ of the twister-wheel and are open at the inner side of said section, so that the balls may be inserted after the section has been placed in the annular bearing B, and when the section $C^2$ is placed in position the balls will be securely held in their sockets.

The second object is to diminish the friction of the wires passing through the wire-passages in the twister-wheels. For this purpose I provide sockets on the inner sides of said wire-passages, in which are placed balls K, adjacent to each other and forming between them a groove-bearing for the wire.

These balls are also preferably secured in the section C' of the twister-wheel, which in the construction shown in the drawings is provided centrally with the sockets $g$, arranged around a pin L. This pin is in the form of a shouldered screw, the shank of which engages with the threaded aperture in the reinforcement $d$, said screw being also provided with a head $h$, which forms a retaining-flange and serves to hold the balls in position in their sockets. The sockets $g$ are separated from each other by wings or lugs $i$, as indicated in Figs. 3 and 4, and as these sockets are preferably of rectangular form the balls therein will contact at a few points only.

It will be understood from the construction described that the balls K are held in their sockets in the section C' independent of the section $C^2$, and thus the wheels may be more readily engaged in their bearings without danger of the balls being misplaced during the operation.

In Figs. 1, 3, and 4 of the drawings I have shown the wire-passages $c$ as being provided with entering-slots $c'$, adapted to register with corresponding entering-slots $c^2$ in the annular bearing B, and this construction permits of more readily engaging the machine with the fence-wires. I may, however, employ a construction in which no such entering-slots are used, but in which the wires must be threaded through the apertures $c$. With this latter construction the balls J may be arranged, as shown in Fig. 6, in an annular groove in the twister-wheel, which forms the ball-race around which the balls may travel.

What I claim as my invention is—

1. A twister-wheel having a recess formed at the inner side of the wire-passage therethrough, balls in said recess forming a bearing for the wire and a retaining-flange for holding said balls in said recess.

2. A twister-wheel having wire-passages formed therethrough and a central recess opening into said passage, balls in said recess, and a central headed pin around which said balls are arranged and by which they are retained in said recess so as to form bearings for the wires in said wire-passages.

3. In a fence-machine, the combination with a frame having an annular bearing thereon, of a twister-wheel formed in two sections adapted to be clamped together upon opposite sides of said bearing, one of said sections having a series of peripheral recesses open at the inner side of said section, and balls in said recesses adapted to bear against said annular bearing and to be retained in position by the opposite twister-section.

In testimony whereof I affix my signature in presence of two witnesses.

WILLIAM H. JONES.

Witnesses:
M. B. O'DOGHERTY,
H. C. SMITH.